Oct. 2, 1962 J. E. HORSTE 3,056,309
CONNECTOR
Filed Feb. 9, 1961 2 Sheets-Sheet 2

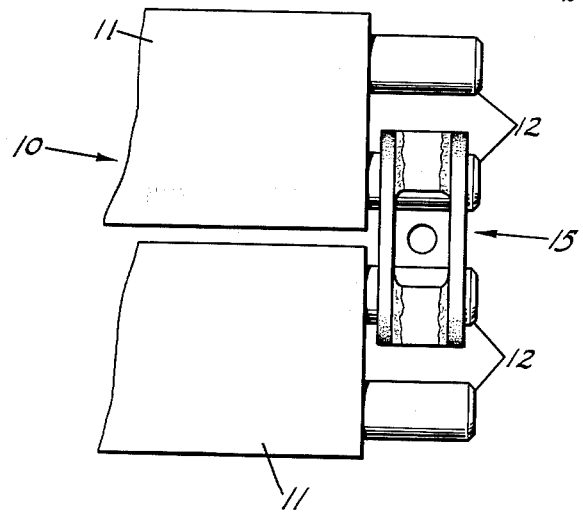
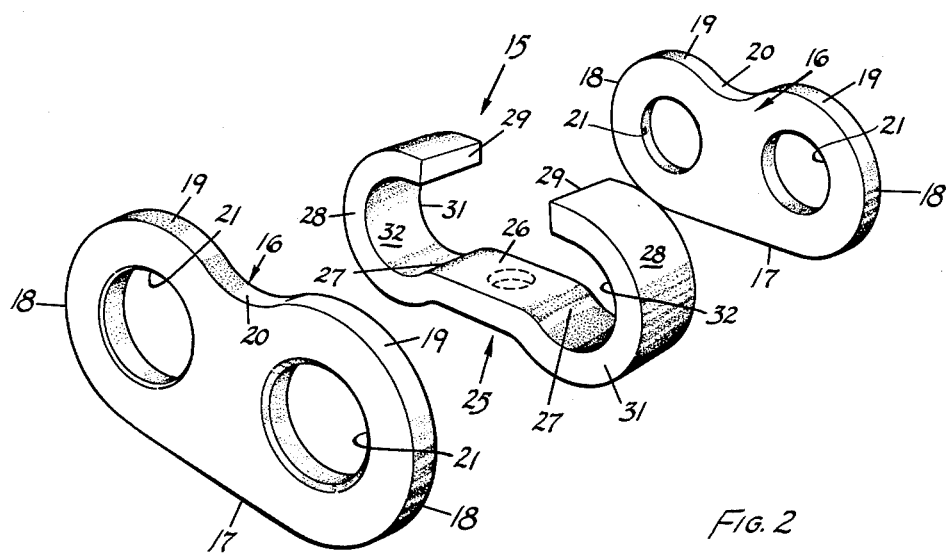

INVENTOR.
JOSEPH E. HORSTE
BY
WILSON, SETTLE & CRAIG
ATTORNEYS

United States Patent Office 3,056,309
Patented Oct. 2, 1962

3,056,309
CONNECTOR
Joseph E. Horste, 16531 Savage Road, Belleville, Mich.
Filed Feb. 9, 1961, Ser. No. 88,066
6 Claims. (Cl. 74—258)

The present invention relates to a connector for an articulated tank tread, such as used on military tanks or the like and to a method of making such a connector.

In a tread for tanks or the like, the endless articulated tracks usually consist of individual "pad" sections secured together by connectors which bridge adjacent sections and which are pivotally secured thereto on transverse pivot pins.

The connectors thus interconnect the tank sections and, in use, are subjected to substantial tensile stresses tending to elongate the connector holes and the material therebetween. However, the track design, particularly the support therefor, is such that no substantial side or twisting forces are exerted on the connectors.

Previously, such connectors were formed by the machining of relatively massive steel forgoings formed as a solid block and having exterior dimensions corresponding to the maximum dimensions of the connector. The expensive and time consuming machine included the complete drilling of the pivot pin holes and the milling out of the connector center portion to reduce the connector mass in addition to surface finishing and center-hole boring operations.

The present invention now proposes a new and novel connector of the type above described, the connector being formed as a composite, welded asesmbly requiring only a fraction of the machining heretofore necessary and eliminating the necessity of forging the massive steel blank which served as the starting piece in the earlier connectors. Further, this invention proposes a new and different method of making a connector by the initial formation of three separate components, two of which are identical and all of which are formed to the rough shape of the final connector, assembling the components into a unitary assembly by welding or brazing, and then finally machining only those portions of the assembly which are of critical dimension or contour.

It is, therefore, an important object of the present invention to provide an improved connector for an articulated track tread and to provide an improved method of making such a connector.

Another important object of this invention is the provision of an improved connector formed as a welded assembly of individual side plates and a center section of a contour such as to materially reduce the amount of machining required to form a final composite connector.

It is a further important object of this invention to provide a method of making a connector for a track tread or the like by the formation of two separate, identical end plates and a center section having arcuate extremities, then assembling the plates and center section and welding the components into a unitary assembly followed by machining of the unitary assembly to its final critical dimensions.

Still another important object of this invention is the provision of a tank tread connector or the like wherein side plates and a center section are welded into a unitary assembly, the side plates being provided with spaced transverse apertures and the center section being formed with arcuate extremities substantially concentric with the end plate apertures, followed by machining of the side plate apertures and the arcuate sections only of the center section to provide accurately located and sized apertures in the assembly and the boring of an aperture in the center section and the formation of a recess bridging the center section and extending into the side plates and their welded connection to the center section.

Other objects of this invention will appear in the following description and appended claims, reference being had to the accompanying drawings forming a part of this specification wherein like reference characters designate corresponding parts in the several views.

On the drawings:

FIGURE 1 is a fragmentary elevational view of a track tread provided with a connector of the present invention;

FIGURE 2 is an exploded perspective view of the parts making up the composite connector of the present invention;

Figure 3:
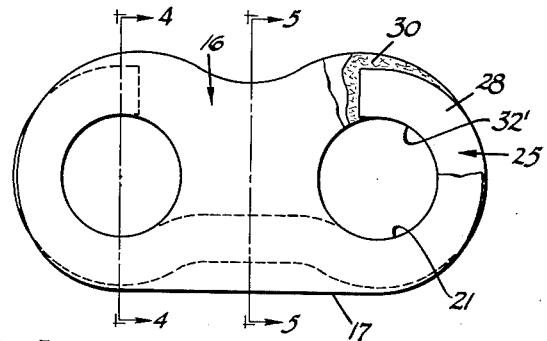
FIGURE 3 is a side elevational view of the components of FIGURE 2 assembled.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a track tread comprising a pair of spaced pads 11 having at least their exposed surfaces formed of rubber or the like and provided with transversely projecting pivot pins 12. Adjacent pins 12 of the adjacent pads 11 are secured together by a connector of the present invention indicated generally at 15.

As best illustrated in FIGURE 2 of the drawings, the connector 15 of the present invention comprises a pair of end plates 16 which are preferably stamped from steel plate stock or the like and each of which comprises a lower edge surface 17, arcuate edge end surfaces 18 blending into upper convex edge portions 19, and a concave center portion 20. Each such end plate 16 is provided with a pair of longitudinally spaced, transverse apertures 21 concentric with the arcuate end surfaces 18.

The assembly 16 also includes a center section, indicated generally at 25, and comprising a raised lower center portion 26 joined through downturned joining portion 27 to arcuate end portions 28 terminating in spaced inner edges 29.

Figure 4:
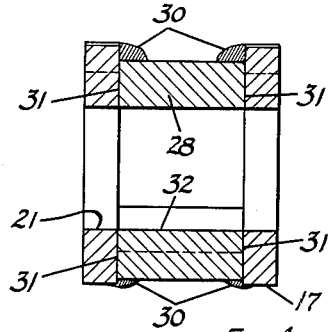
FIGURE 4 is a sectional view taken along the plane 4—4 of FIGURE 3.
Figure 5:
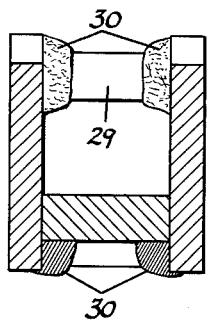
FIGURE 5 is a sectional view taken along the plane 5—5 of FIGURE 3.
Figure 6:
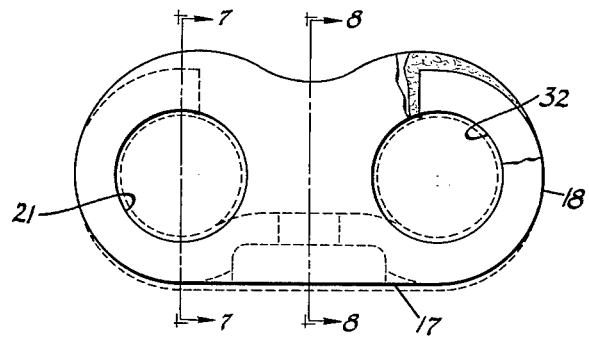
FIGURE 6 is a view similar to FIGURE 3 illustrating the finished connector.
Figure 7:
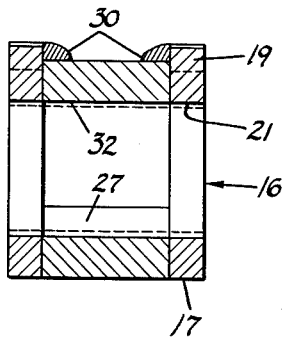
FIGURE 7 is a sectional view taken along the plane 7—7 of FIGURE 6.
Figure 8:
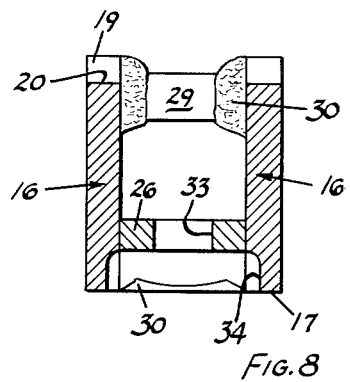
FIGURE 8 is a sectional view taken along the plane 8—8 of FIGURE 6.
Figure 9:
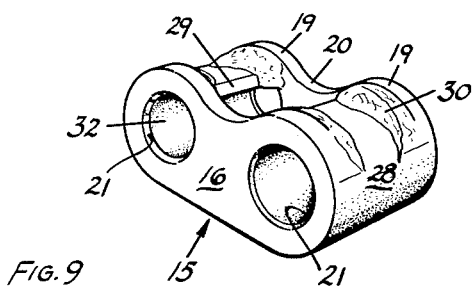
FIGURE 9 is a perspective view, on a reduced scale, of the finished connector of the present invention.

As best illustrated in FIGURES 3 through 5, the side side plates 16 and the center section 25 are secured together into an assembly by means of relatively massive welds, indicated generally at 30, extending along substantially the complete exterior circumference of the center section 25 and completely defining the outer lines of contact between the side faces 31 of the center section 25 and the side plates 16. In other words, substantially the entire extent of the center section side faces 31 and the side plates are welded to one another into an extremely strong assembly.

It will be noted that the curvature of the inner surfaces 32 of the arcuate end portions 28 of the center section is substantially the same as the periphery of the side plate apertures 21 and that transverse registry is maintained between the apertures 21 and the inner periphery 32 of the curved surfaces 28 in the composite unfinished article illustrated in FIGURES 3 through 5.

Next, the composite and welded assembly of FIGURES 3 through 5 is finally machined to the contour and shape illustrated in FIGURES 6 through 9. Initially, it will be noted that the apertures 21 and the inner periphery 32 of the curved end portions 28 of the center section are sized, as by a reaming operation which can be performed much more readily than the heretofore necessary drilling operation in the previous forged blank. Secondly, the curved exterior surface 18 of the side plates and the exterior surface of the curved portions 28 of the center section are surface finished so as to be concentric with the transverse apertures 21, thereby providing for adequate clearance between adjacent assemblies 15 in the final tread 10 as illustrated in FIGURE 1.

Additionally, it will be noted that the center section 25 has its lower central portion 26 apertured, as at 33, by a piercing or drilling operation, the apertures 33 being concentric with an open-bottomed recess 34 formed not only in the center section portion 26 but also in the adjacent portions of the side plates 16 intermediate the apertures 21 therein. Of course, in forming the recess 34, it is necessary that a portion of the welded connection between the parts be removed.

Thus, it will be readily seen that the present invention provides a new and novel connector and an efficient, novel process or method for making such connectors. The great reduction in the amount of machining necessary will be readily apparent to those skilled in the art.

More specifically, there is no need for milling out the space required intermediate the terminal edges 29 of the upper portions of the center section, nor is there any need for completely boring the transverse apertures 21, since only a reaming or finishing operation is necessary. Further, any surface removal is readily accommodated at the arcuate ends 18 of the assembly or at the bottom portions defined by the lower extremity 17 of the side plates.

In an analysis of the stresses to which the assembly 15 is subjected during operation, it has been determined that substantially the only stresses involved are tensile stresses in the side plates, caused by attempted separation of the pivot pins 12 positioned in the apertures 21. These tensile stresses tend to stretch and otherwise deform the arcuate portions 28 of the center section 25 and to elongate the holes 21. Such stresses are ideally resisted by the welded assembly in which the outer arcuate extremities of the pin-receiving holes are defined by the inner peripheral surfaces 32 intermediate the side plate apertures. The final reaming of the holes yields full pin contact with the side plates and the center section surfaces.

Having thus described my invention, I claim:

1. A connector for a tank track or the like comprising a pair of planar side plates, a center section interposed between said side plates and having arcuate end portions concentric with registering transverse apertures in each of said side plates, respectively, and relatively massive welds joining said plates and said section, said center section having an aperture therein intermediate said end portions and a recess concentric with said aperture and of a diameter greater than the transverse dimension of said center section, so that said recess extends into a portion of the weld joining said side plates to said center section.

2. A connector for a tank track or the like comprising a pair of planar side plates each having spaced transverse apertures, a unitary center section interposed between said side plates and having inturned spaced arcuate end portions concentric with the apertures in each of said side plates, respectively, and means securing said plates and said center section in rigid assembly.

3. A method of making a connector for a tank track or the like comprising aligning a pair of planar side plates with a center section having arcuate extremities so that spaced transverse apertures in the side plates are concentric with the arcuate extremities of said center section, securing said side plates and said center section into firm assembly, and then radially enlarging the side plate apertures and those portions of the center section aligned therewith to provide accurately spaced and located transverse bearing openings.

4. A connector for a tank track or the like comprising a pair of planar side plates each having spaced transverse apertures, a unitary center section interposed between said side plates and having arcuate end portions terminating in free edges spaced longitudinally of the connector, said arcuate end portions each being concentric with and circumscribing an appreciable extent of the apertures in the side plates, and massive welds extending entirely circumferentially of said center section to rigidly join said center section to each of said side plates.

5. A method of making a connector for a tank track or the like comprising interposing a center section between a pair of planar side plates, the center section having arcuate extremities and the side plates each having spaced transverse apertures concentrically aligned transversely with the arcuate extremities of said center section, welding said side plates to said center section, and then reaming the side plate apertures and the center section portions aligned therewith.

6. A method of making a connector for a tank track or the like comprising assembling a pair of planar side plates in contact with a center section having arcuate extremities, said side plates each having spaced transverse apertures concentric with the arcuate extremities of said center section, peripherally welding said side plates and said center section throughout substantially their entire lines of contact, substantially enlarging the plate apertures and removing a portion of the arcuate extremities to provide accurate transverse bores in the connector, and finally surface finishing the side plates and the center section to accurate contour.

References Cited in the file of this patent

UNITED STATES PATENTS 2,450,565     Saifyrd _____ Oct. 5, 1948

FOREIGN PATENTS 19,155     Great Britain _____ 1896

UNITED STATES PATENT OFFICE

CERTIFICATE OF CORRECTION

Patent No. 3,056,309                          October 2, 1962

Joseph E. Horste

It is hereby certified that error appears in the above numbered patent requiring correction and that the said Letters Patent should read as corrected below.

Column 1, line 22, for "forgoings" read -- forgings --; line 25, for "machine" read -- machining --; line 32, for "asesmbly" read -- assembly --; column 2, line 59, strike out "side".

Signed and sealed this 14th day of May 1963.

(SEAL)
Attest:

ERNEST W. SWIDER                              DAVID L. LADD
Attesting Officer                                   Commissioner of Patents